(12) United States Patent
Kim et al.

(10) Patent No.: US 9,325,886 B2
(45) Date of Patent: Apr. 26, 2016

(54) SPECULAR AND DIFFUSE IMAGE GENERATOR USING POLARIZED LIGHT FIELD CAMERA AND CONTROL METHOD THEREOF

(71) Applicant: Korea Institute of Science and Technology, Seoul (KR)

(72) Inventors: Jae Won Kim, Seoul (KR); Ig Jae Kim, Goyang-si (KR); Sang Chul Ahn, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 14/220,574

(22) Filed: Mar. 20, 2014

(65) Prior Publication Data

US 2015/0146082 A1 May 28, 2015

(30) Foreign Application Priority Data

Nov. 28, 2013 (KR) .......................... 10-2013-0146533

(51) Int. Cl.
*H04N 5/225* (2006.01)
*G02B 5/20* (2006.01)
*G02B 5/30* (2006.01)

(52) U.S. Cl.
CPC ............. *H04N 5/2254* (2013.01); *G02B 5/20* (2013.01); *G02B 5/30* (2013.01)

(58) Field of Classification Search
CPC .... H04N 5/2254; G02B 5/20; G02B 13/0015; G02B 5/30; G02B 5/3025

USPC .................................................. 348/340, 335
See application file for complete search history.

(56) References Cited

U.S. PATENT DOCUMENTS

| | | | |
|---|---|---|---|
| 7,626,585 B2* | 12/2009 | Kondo et al. .................. | 345/426 |
| 8,345,144 B1* | 1/2013 | Georgiev et al. .............. | 348/340 |
| 2007/0222781 A1* | 9/2007 | Kondo et al. .................. | 345/426 |
| 2010/0303344 A1* | 12/2010 | Sato et al. ..................... | 382/162 |
| 2012/0177356 A1 | 7/2012 | Georgiev et al. | |
| 2012/0268571 A1 | 10/2012 | Debevec et al. | |

FOREIGN PATENT DOCUMENTS

JP         3955616 B2     8/2007
KR   10-2012-0085935 A     8/2012

OTHER PUBLICATIONS

Nayar, Shree K., et al. "Fast separation of direct and global components of a scene using high frequency illumination," *ACM Transactions on Graphics (TOG)*, vol. 25, No. 3., (Jul. 2006), pp. 935-944.
Korean Office Action issued on Nov. 6, 2014, in counterpart Korean Application No. 10-2013-0146533 (4 pages, in Korean).

* cited by examiner

*Primary Examiner* — Nhan T Tran
(74) *Attorney, Agent, or Firm* — NSIP Law

(57) ABSTRACT

An image generator is provided which obtains a specular image and a diffuse image from an image acquired by a polarized light field camera by separating two reflection components of a subject, and a control method thereof. The image generator may include a main lens, a polarizing filter part, a photosensor, a microlens array, and a controller that generates a single image in response to the electrical image signal and extracts, from the generated image, a specular image and a diffuse image that exhibit different reflection characteristics of the subject.

6 Claims, 4 Drawing Sheets

Diffuse+Specular image     Diffuse image     Specular image

SPECULAR AND DIFFUSE IMAGE GENERATOR USING POLARIZED LIGHT FIELD CAMERA AND CONTROL METHOD THEREOF

CROSS-REFERENCE TO RELATED APPLICATION

Pursuant to 35 U.S.C. §119(a), this application claims the benefit of earlier filing date and right of priority to Korean Application No 10-2013-0146533, filed on Nov. 28, 2013, the contents of which is incorporated by reference herein in its entirety.

BACKGROUND OF THE INVENTION

1. Field of the Invention

The present invention relates to an image generator which obtains a specular image and a diffuse image from an image acquired by a polarized light field camera by separating two reflection characteristics of a subject, and a control method thereof.

2. Background of the Invention

Every scene we see in our daily lives come into view as the light emitted from a light source hits objects and is then reflected and perceived by our optic nerves. Modeling the color, intensity, and direction of light from a specific type of lighting equipment by a computer by simulating the relationship between light seen through the eyes and a light source is one of the most basic parts of accurate and realistic rendering. To this end, various studies on lighting are being made for realistic 3D rendering in the computer graphics field.

In general, lighting commonly used for rendering a scene in the computer graphics field is categorized into ambient light, diffuse light, and specular light for better efficiency, and the scene is rendered based on the relationship between this light source and the subject surface. The relationship between an object and light in the real world is more complicated because there exist various types of indirect lighting such as light reflected, transmitted, or refracted by other objects, as well as light reflected on the surface. If such indirect lighting is used in 3D modeling, a more realistic representation can be achieved. However, it takes a lot of time to perform rendering, taking into account the effect of light traveling between subjects, and even if rendering is performed over a long time, it is hard to achieve a complex indirect lighting effect such as light scattering within the surface. Accordingly, a variety of methods of applying lighting effects have been developed in computer graphics to give a realistic representation of a scene in a 3D space.

As well as 3D model lighting, research on techniques of splitting a 2D scene into a specular component and a diffuse component has been conducted in the image processing field. Examples of these techniques include a technique of removing the specular component by a PED (partial differential equation) approach, a technique of distributing the specular component and the diffuse component in the chromaticity space of a single image, a technique of defining the specular component and the diffuse component in a 3D space consisting of brightness, saturation, and tone, and a technique of splitting the specular component and the diffuse component by image-based, high-frequency lighting. With these techniques, a diffuse reflection texture map with no specular component can be used in image-based 3D modeling. Also, each component can be individually processed and combined for image editing.

In a paper titled "Fast Separation of Direct and Global Components of a Scene using High Frequency Illumination" (ACM Trans. on Graphics, 2006), the method of obtaining multiple images by a video projector and an ordinary camera and separating a specular image and a diffuse image through a computation process was introduced. In this method, a high-frequency pattern is irradiated on a target scene by a video projector, and multiple images acquired by varying the position of this pattern are computed according to a specific formula, thereby obtaining separate specular and diffuse images.

In a paper titled "Multiview Face Capture using Polarized Spherical Gradient Illumination" (ACM Trans. on Graphics, 2011), the technique of separating specular and diffuse images of a target person and presenting a realistic digital rendering of that person was proposed. Two images are required to separate the specular image and the diffuse image and at least four images are required to obtain 3D reflection information, so a total of 4*2=8 images are required.

To support and increase the functions of 3D modeling, improving the structural part and/or software part of an image generator that separates a specular image and a diffuse image is being considered. Further, there is a growing demand for new image generators capable of fast extracting a specular image and a diffuse image.

SUMMARY OF THE INVENTION

Therefore, an aspect of the present invention is to provide an image generator which extracts a specular image and a diffuse image by using lighting equipment with a polarizing film attached on it, rather than using an expensive special lighting device such as a video projector, and a control method thereof.

Another aspect of the present invention is to provide an image generator which extracts a specular image and a diffuse image from one image without the need to acquire multiple images, and a control method thereof.

To achieve these and other advantages and in accordance with the purpose of this specification, as embodied and broadly described herein, there is provided an image generator including: a main lens that forms an optical image of a subject on a focal plane; a polarizing filter part that is placed on the focal plane and filters the optical image by using first and second polarizing filters that are at right angles to each other; a photosensor that converts the optical image into an electrical image signal; a micmrolens array that is placed between the polarizing filter part and the photosensor and includes a plurality of microlenses that focus light on the focal plane; and a controller that generates a single image in response to the electrical image signal and extracts, from the generated image, a specular image and a diffuse image that exhibit different reflection characteristics of the subject.

In one embodiment, the image generator further includes a light source part that projects first polarized light that vibrates in one direction on the subject, and the first polarizing filter allows the first polarized light to pass therethrough, and the second polarizating filter allows second polarized light that vibrates in a direction vertical to the former direction to pass therethrough.

In one embodiment, the controller extracts the diffuse image by sampling regions that have passed through the second polarizing filter from the entire region of the generated image.

In one embodiment, the controller generates a sample image by sampling the regions that have passed through the first polarizing filter, and extracts the specular image by using the difference between the sample image and the diffuse image.

In one embodiment, each of the microlenses projects part of the optical image on a predetermined region of the photosensor.

In one embodiment, the single image includes a plurality of images that are generated by the microlens array.

In one embodiment, the first and second polarizing filters are placed on the same focal plane.

According to the present invention, there is provided a control method of an image generator, the control method including: projecting first polarized light that vibrates in one direction on a subject and receiving the light reflected from the subject; refracting the received light by the main lens onto the focal plane; filtering the refracted light through a polarizing filter part placed on the focal plane, the polarizing filter part including first and second polarizing filters that are at right angles to each other, the first polarizing filter allowing the first polarized light to pass therethrough, and the second polarizating filter allowing second polarized light that vibrates in a direction vertical to the former direction to pass therethrough; receiving the filtered light from the polarizing filter part by the microlens array, the microlens array including a plurality of microlenses that focus light on the focal plane; receiving light from the microlens array by a photosensor and converting an optical image formed by the main lens into an electrical image signal; and generating a single image in response to the electrical image signal and extracting, from the generated image, a specular image and a diffuse image that exhibit different reflection characteristics of the subject.

In one embodiment, the extracting of the specular image and the diffuse image includes: extracting the diffuse image by sampling regions that have passed through the second polarizing filter from the entire region of the generated image; generating a sample image by sampling the regions that have passed through the first polarizing filter; and extracting the specular image by using the difference between the sample image and the diffuse image.

In one embodiment, the first and second polarizing filters are placed on the same focal plane.

An image generator according to an embodiment of the present invention captures an image by using lighting equipment with a polarizing film attached on it, instead of an expensive special lighting device such as a video projector, and using a polarized light field camera. The image generator can extract a specular image and diffuse image from a single image by using a polarizing filter part placed on the focal plane of the main lens. As such, 3D reflection information can be obtained faster than using the conventional techniques. As a subsequence, real-time 3D modeling and cost reduction can be achieved. Hence, a realistic digital rendering of target objects can be presented in real time, and this can be applied to a wide range of visual applications such as digital broadcasting, filmmaking, avatar creation, and so on.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

As used herein, the suffixes 'module' and 'part' are used to denote elements in order to facilitate the disclosure only. Therefore, significant meanings or roles are not given to the suffixes themselves, and it is understood that the suffixes 'module' and 'part' can be used together or interchangeably. When it is determined that the detailed description of the related known art may obscure the gist of the present invention, the detailed description thereof will be omitted Furthermore, it will be apparent that the appended drawings are merely provided to facilitate the understanding of the scope and spirit of the present invention, and that the appended drawings are not provided to limit the scope and spirit of the present invention.

An image generator to be described in this specification has a high-resolution digital camera, and separates a specular image and a diffuse image from one image captured by the digital camera. That is, the image generator can generate a single image, a specular image, and a diffuse image.

As used herein, the high-resolution digital camera to be described in this specification is a full-resolution radiance camera, which may include a light field camera using a microlens array, a pinhole array, or a mask pattern, a plenoptic camera, etc. The following description will be made on, but not limited to, a light field camera, for convenience of explanation.

In addition, a configuration according to an embodiment disclosed in this specification is applicable to a stationary terminal or mobile terminal including the above-described camera.

Figure 1:
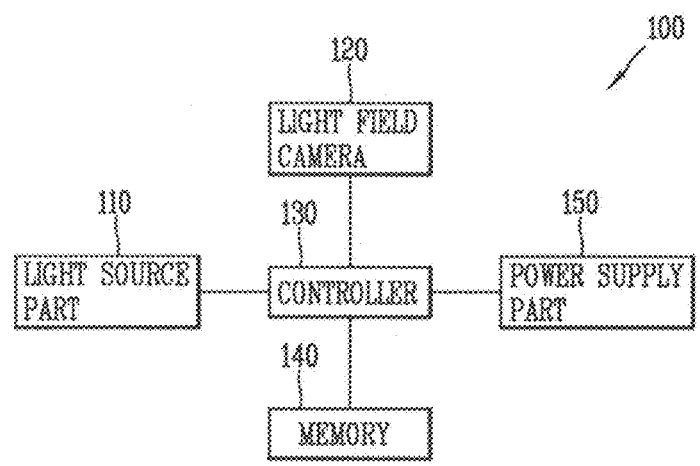
FIG. 1 is a block diagram showing an image generator according to an embodiment disclosed in this specification.
Figure 2A:
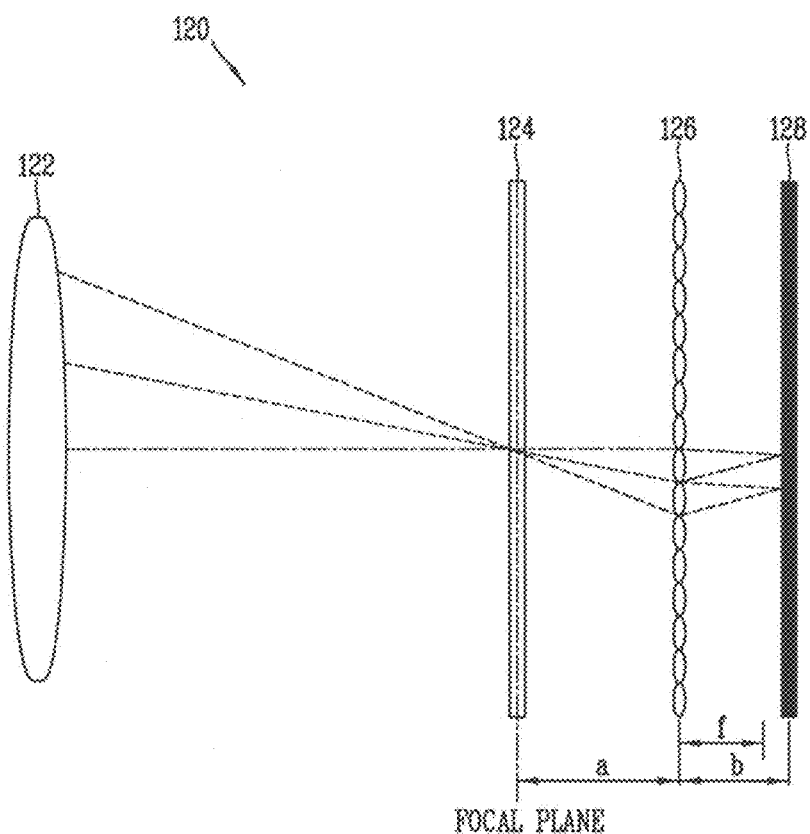
FIGS. 2A and 2B are conceptual diagrams for explaining a detailed configuration of the light field camera illustrated in FIG. 1.
Figure 2B:
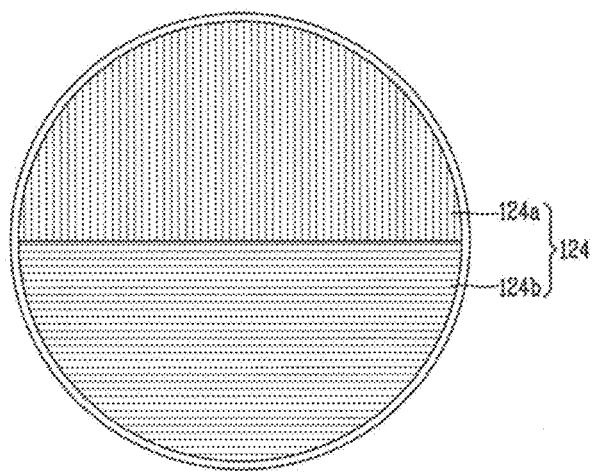

FIG. 1 is a block diagram showing an image generator according to an embodiment disclosed in this specification. FIGS. 2A and 2B are conceptual diagrams for explaining a detailed configuration of the light field camera illustrated in FIG. 1.

The image generator 100 may include a light source part 110, a light field camera 120, a controller 130, a memory 140, and a power supply part 150. The components illustrated in FIG. 1 are not essential; instead, the image generator may include more or less components.

Hereinafter, the components will be discussed in order.

The light source part 110 casts light toward a subject (or target object) when capturing images of the subject with the light field camera 120. For example, the light source part 110 may be a flash lamp.

The light source part 110 projects first polarized light that vibrates in one direction on the subject. For example, the light source part 110 may include a polarizing filter positioned in front of the flash lamp. If the polarizing filter is a vertical polarizing filter which blocks polarized light other than vertical polarized light that vibrates vertically, only the vertical polarized light reaches the subject.

The light field camera 120 is a device that captures 4-dimensional information about light rays reflected from the subject. That is, the light field camera 120 can convert light generated from the light source part 110 and reflected from the subject into an electrical image signal.

A conventional camera has a focal plane. The focal plane refers to the plane upon which light coming through the lens is focused at a point. Depth of field is determined by the amount of light flowing into the focal plane or other factors. Depth of field refers to the range of distance before and beyond the lens' focal point in which subjects appear acceptably 'in focus'. Everything beyond this range will be blurry.

Unlike a typical digital camera that largely consist of a lens and a pickup device, the light field camera 120 includes a main lens 122, a photosensor (or pickup device) 128, and a microlens array 126 positioned between the main lens 122 and the photosensor 128, as shown in FIG. 2A. While an embodiment of the present invention will be described with respect to the microlens array 126 for convenience of explanation, the microlens array 126 can be replaced with other components known to those skilled in the art, such as a pinhole array or a pattern mask film.

The photosensor 128 is a digital device that captures light and converts it into an electrical image signal, and may be a charge-coupled device (CCD) that operates by accumulating and transferring charges.

The light field camera 120 uses multiple microlenses placed at the focal plane of the main lens 122. An optical image formed by the main lens 122 is converted into an electrical image signal by the photosensor 128 positioned slightly behind the microlenses. The light field camera 120 can analyze out-of-focus areas of images captured by the microlenses and obtain 4-dimensional information about light rays reflected from the subject.

The microlenses included in the microlens array 126 will be discussed in more detail. All the microlenses have the same focal length (f). The microlenses may be separated from the photosensor 128 by multiples of the focal length. For example, the distance (b) between the microlens array 126 and the photosensor 128 may be 4/3 f, 3/4 f, or 1.5 f the focal length (f) of the microlenses. Also, the microlenses focus light on the focal plane of the main lens 122.

The light field camera 120 can analyze numerous small images generated by the microlenses and then generate a single image by using software for manipulating and combining them. An image (hereinafter, referred to as a 'light field image') captured by the light field camera 120 can be turned into a picture with a different feel by changing the focal plane or depth of field. Accordingly, the light field camera 120 is able to refocus a picture after the picture is taken.

The controller 130 can adjust a light field image to focus on the foreground or focus on objects placed in the middle ground or background. Also, the controller 130 can represent a stereoscopic 3D (S3D) image.

Light reflected from a subject is a mixture of two components: a specular component and a diffuse component. The two reflection components vary with the material or surface roughness of the subject. Thus, it is very important to accurately measure the two components when rendering the subject in a realistic way.

To extract these specular and diffuse components, the image generator according to an embodiment of the present invention projects first polarized light on the subject by using the light source part 110, and captures the first polarized light reflected from the subject by using the camera 120. As shown in FIG. 2, the light field camera includes a polarizing filter part 124 positioned on the focal plane of the main lens 122.

The light field camera 120 including the polarizing filter part 124 is hereinbelow called a 'polarizing light field camera'.

The polarizing filter part 124 includes a first polarization area 124a and a second polarization area 124b which are at a right angle to each other. The first polarization area 124a allows first polarized light that vibrates in one direction to pass therethrough, and the second polarization area 124b allows second polarized light that vibrates in a direction perpendicular to the former direction to pass therethrough. For example, the first polarized light may be vertically polarized light that vibrates in a vertical direction, and the second polarized light may be horizontally polarized light that vibrates in a horizontal direction. The polarizing filter part 124 may be made in a circular shape, and vertical and horizontal polarizing filters may be respectively located at the upper and lower semicircles or vice versa.

In the present invention, it is assumed for convenience of explanation that the vertical polarizing filter is positioned on the upper portion (or first polarization area) 124a of the polarizing filter part and the horizontal polarizing filter is positioned on the lower portion (or second polarization area) 124b of the polarizing filter part, and it is also assumed that the light source part 110 projects vertically polarized light that can pass through the upper portion 124a on the subject.

If the vertically polarized light is reflected against the subject and reaches the light field camera 120, the light rays passing through the lower portion 124b are blocked by the horizontal polarizing filter. In contrast, the light rays passing through the upper portion 124a pass through the vertical polarizing filter and reach the photosensor 128 through the microlens array 126.

Vertically polarized light irradiated by a flash lamp is reflected on the surface of the subject, in the form of a mixture of specular and diffuse components. In this case, the specular components remains polarized, but the diffuse component loses its polarization properties. Accordingly, the diffuse component can pass through both the upper portion 124a and the lower portion 124b, whereas the specular component can pass through only the upper portion 124a.

Figure 3:
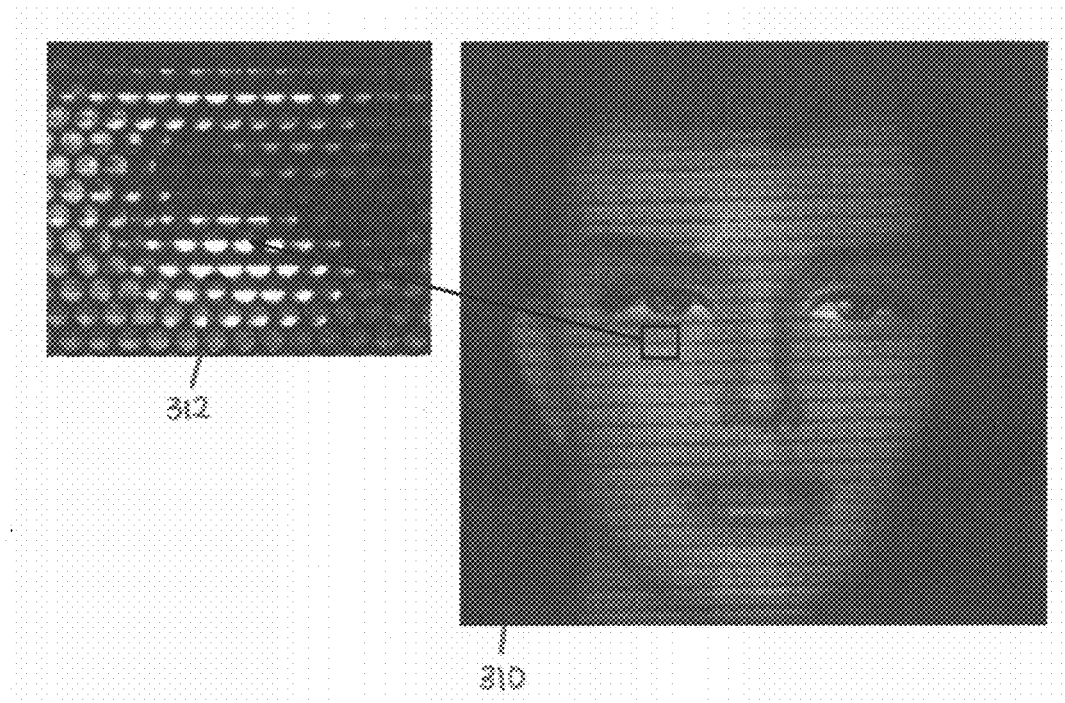
FIG. 3 is an illustration showing an example of an image obtained by an image generator according to an embodiment of the present invention.

FIG. 3 is an illustration showing an example of an image obtained by an image generator according to an embodiment of the present invention. Referring to FIG. 3, a circular pattern is repeated, as can be seen from an image 310. The circular pattern in the image 310 is formed by any one of the microlenses included in the microlens array 126. That is, the microlenses project part of an optical image formed by the main lens 110 on a predetermined region of the photosensor, and generates a microimage on the predetermined region. By doing so, an image formed by the light field camera 120 is created by combining microimages formed by the microlenses together.

Due to refraction by the lens, the light rays transmitted through the lower portion 124b substantially reach the upper area of the photosensor, and the light rays transmitted through the upper portion 124a substantially reach the lower area of the photosensor. That is, as shown in FIG. 3, in a particular microimage 314, the upper semicircle is an image formed by the light transmitted through the lower portion 124b of the polarizing filter part, and the lower semicircle is an image formed by the light transmitted through the upper portion 124a of the polarizing filter part.

When closely viewing the particular microimage 314, a bright image is focused only on the lower semicircle. This is because the diffuse component is blocked by the lower portion 124b of the polarizing filter part, causing a relative lack of light. That is, the lower semicircle of the microimage is the portion that has passed through the upper portion 124a of the polarizing filter part 124, and the upper semicircle of the microimage is the portion that has passed through the lower portion 124b of the polarizing filter part 124. Since the specular component is blocked by the polarizing filter part 124, the lower portion of the microimage contains a specular component and a diffuse component, and the upper portion of the microimage contains only a diffuse component.

Referring again to FIG. 1, the memory 140 stores information about the center position of microimages captured by the microlenses, out of the entire region of an image (hereinafter, referred to as a 'polarized light field image') captured by the light field camera 120. That is, coordinate information (x-axis and y-axis) about the center position of microimages captured by each microlens can be stored individually.

Figure 4:
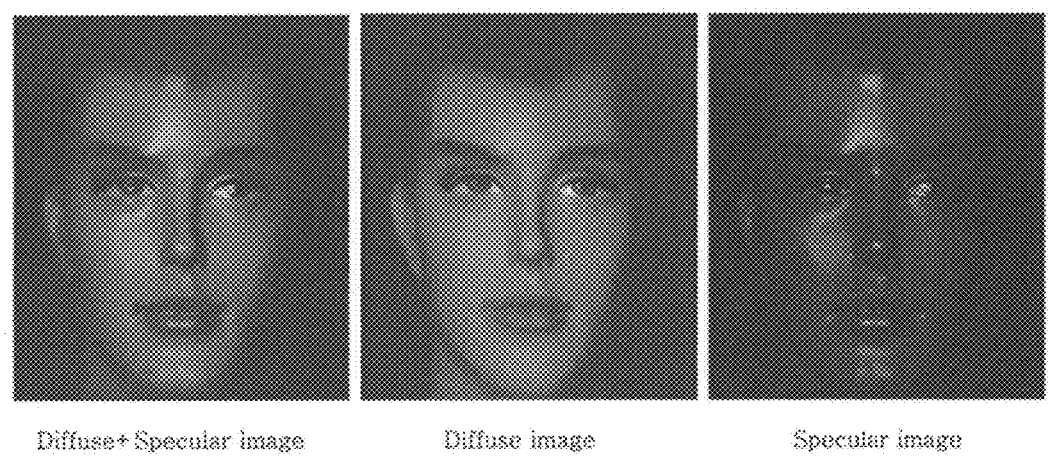
FIG. 4 is an illustration showing a sample image, a specular image, and a diffuse image that are separated from the image of FIG. 3.

The controller 130 can generate a new image of the subject by sampling pixels only in the upper portion of each microimage and sequentially allocating the average of the sampled pixels in the x- and y-axis directions. The generated image corresponds to the diffuse image shown in FIG. 4. The diffuse image refers to an image that is obtained by removing the specular component and capturing only the diffuse image.

Next, the controller 130 generates a sample image of the subject by sampling pixels in the lower portion of each microimage and sequentially allocating the average in the x- and y-axis directions. The sample image corresponds to a combination of the diffuse+specular images of FIG. 5.

Figure 5:
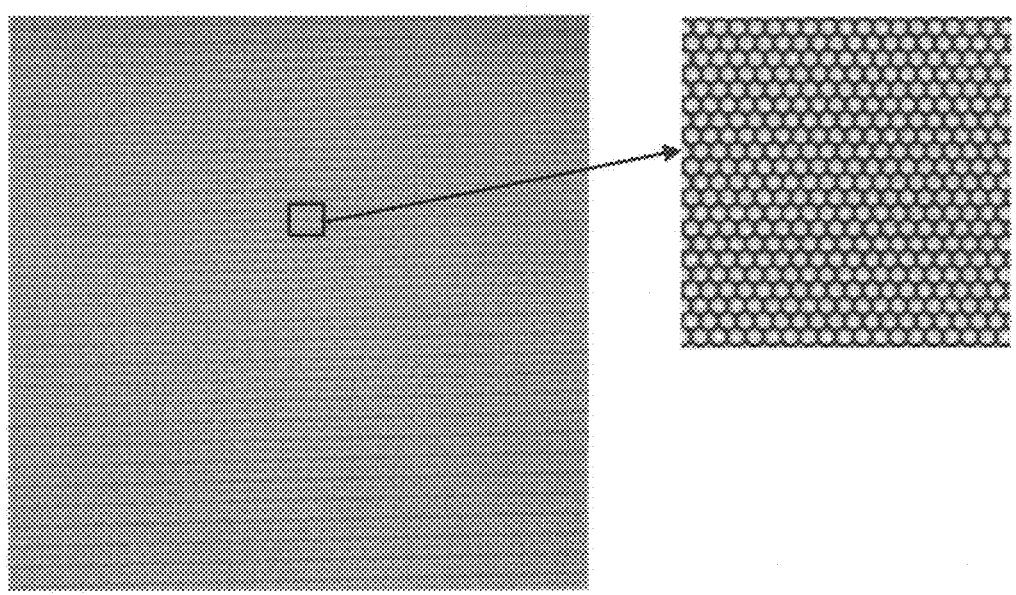
FIG. 5 is an illustration showing a reference image for obtaining the center position of microlenses included in a microlens in an image generator according to an embodiment of the present invention.

Once the difference between the sample image and the diffuse image is obtained, the controller 130 can generate the specular image of FIG. 5 by subtracting the diffuse image from the diffuse+specular image. The specular image refers to an image that is obtained by removing the diffuse component and capturing only the specular image.

As a result, the controller 130 can generate a specular image, a diffuse image, and a diffuse+specular image by using a single image (polarized light field image) captured by the light field camera 120.

The memory 140 may store a program for operating the controller 130, and temporarily store generated image data (e.g., a polarized light field image, a sample image, a diffuse image, a specular image, etc). The memory 140 may store information about the center position of a microimage captured by each microlens.

The memory 140 may include at least one type of storage medium from among a flash memory type, a hard disk type, a multimedia card micro type, a card type memory (e.g., an SD memory, an XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disc and an optical disc.

The image generator 100 may also operate in association with a web storage that performs a storage function of the memory 140 on the Internet.

The controller 130 generally controls the overall operations of the image generator 100. For example, the controller 130 performs the control and processing associated with the light source part 110 and the polarization light field camera 120. The controller 130 may be implemented within the light field camera 120 or separately from the controller 130.

The controller 130 may store an image frame processed by the light field camera 120 in the memory 140 or transmit it externally through a communication unit (not shown).

Various embodiments described in the present disclosure can be embodied within a recording medium that can be read by a computer or a similar device using software, hardware, or a combination thereof.

When embodied with hardware, embodiments described in the present disclosure can be embodied using at least one of electrical unit for application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electric unit for performing other functions. In some cases, embodiments described in this specification can be embodied by the controller 130 itself.

When embodied with software, embodiments like a procedure and a function described in this specification can be embodied with separate software modules. Each of the software modules can perform at least one function and operation described in this specification.

A software code may be implemented by a software application written in a suitable programming language. The software code may be stored in the memory 140 and executed by the controller 130.

The image generator according to the embodiment of the present invention may use different circular polarizing filters, instead of a linear polarizing filter, as the polarizing filter part. In this case, the light source part may be a circular polarizing filter for a certain direction.

FIG. 5 is an illustration showing a reference image for obtaining the center position of microlenses included in a microlens in an image generator according to an embodiment of the present invention.

The controller 130 can detect the center position of each microimage of a polarized light field image from a reference image that was previously captured once. The center position can be digitized in x and y coordinates of a two-dimensional image.

In one embodiment disclosed in this specification, the foregoing method may be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of carrier waves (e.g., transmission via the Internet).

A polarization light field camera according to the present invention are not limited in application to the configurations and methods of the embodiments described above and all or some of the embodiments may be selectively combined to implement various modifications.

What is claimed is:
1. An image generator comprising:
a light source part that projects first polarized light that vibrates in one direction on a subject
a main lens configured to form an optical image of the subject on a focal plane;
a polarizing filter part configured to be placed on the focal plane and filters the optical image by using first and second polarizing filters that are at right angles to each other, wherein the first polarizing filter allows the first polarized light to pass therethrough, and the second polarizing filter allows second polarized light that vibrates in a direction vertical to the former direction to a therethrough;

a photosensor configured to convert the optical image into an electrical image signal;

a microlens array configured to be placed between the polarizing filter part and the photosensor, and comprise a plurality of microlenses that focus light on the focal plane; and a controller configured to generate a single image in response to the electrical image signal, and extract, from the generated image, a specular image and a diffuse image that exhibit different reflection characteristics of the subject, wherein:

an entire area of the polarizing filter part is divided into a first area consisting of the first polarizing filter and a second area consisting of the second polarizing filter;

the polarizing filter part is further configured such that light reflected from one point of the subject reaches the microlens array through the first and second polarizing filters; and an image of the one point of the subject, which is captured by one of the plurality of microlenses, is divided into a first area formed by the first polarizing filter and a second area formed by the second polarizing filter.

2. The image generator of claim 1, wherein the controller extracts the diffuse image by sampling regions that have passed through the second polarizing filter from the entire region of the generated image.

3. The image generator of claim 2, wherein, the controller generates a sample image by sampling the regions that have passed through the first polarizing filter, and extracts the specular image by using the difference between the sample image and the diffuse image.

4. The image generator of claim 3, wherein each of the microlenses projects part of the optical image on a predetermined region of the photosensor.

5. The image generator of claim 4, wherein, the single image comprises a plurality of images that are generated by the microlens array.

6. The image generator of claim 1, wherein the first and second polarizing filters are placed on the same focal plane.

* * * * *